United States Patent [19]
Conway

[11] Patent Number: 6,123,443
[45] Date of Patent: Sep. 26, 2000

[54] LIGHTED CURBING AND FLATWORK AND METHOD OF MANUFACTURE

[76] Inventor: Todd Conway, 2744 W. Sweetbasil North, Taylorsville, Utah 84118

[21] Appl. No.: 09/152,221

[22] Filed: Sep. 11, 1998

[51] Int. Cl.[7] ............................................. F21S 3/00
[52] U.S. Cl. ..................... 362/576; 362/145; 362/153.1; 52/102
[58] Field of Search ................................ 362/145, 153.1; 52/102

[56] References Cited

U.S. PATENT DOCUMENTS

| | | |
|---|---|---|
| 2,920,184 | 1/1960 | Kessler . |
| 3,495,352 | 2/1970 | Sbare . |
| 3,500,036 | 3/1970 | Szentveri . |
| 3,663,808 | 5/1972 | Baatz . |
| 4,357,653 | 11/1982 | Kovacs . |
| 4,945,675 | 8/1990 | Kendrick . |
| 5,160,202 | 11/1992 | Légaré . |
| 5,311,414 | 5/1994 | Branham, Sr. . |
| 5,438,804 | 8/1995 | Reum et al. . |
| 5,453,916 | 9/1995 | Tennis et al. . |
| 5,519,970 | 5/1996 | Reum et al. . |
| 5,683,170 | 11/1997 | Blaha ........................................ 362/145 |

OTHER PUBLICATIONS

Declaration of Todd Conway Regarding Non–Documentary Potential Prior Art.

*Primary Examiner*—Sandra O'Shea
*Assistant Examiner*—Anabel M. Ton
*Attorney, Agent, or Firm*—Clayton, Howarth & Cannon, P.C.

[57] ABSTRACT

An apparatus and method of lighted ground curbing, flatwork and other structures having a recessed channel formed therein for receiving a length of flexible sheathed lighting. The separately sheathed lighting is adequately protected independent of the curbing, flatwork or other structure, and is powered by a power source residing separately and independently of the curbing, to thereby eliminate any need for electrical sockets or protective covering to be included as part of the curbing or flatwork portion. The lighting operates to project a substantially continuous stream of light extending continuously along the recess formed in the curbing, flatwork or other structure.

102 Claims, 4 Drawing Sheets

LIGHTED CURBING AND FLATWORK AND METHOD OF MANUFACTURE

BACKGROUND OF THE INVENTION

1. The Field of the Invention

The present invention relates generally to landscape curbing and flatwork. More particularly, it concerns ornamental landscape curbing and flatwork which projects lighting outwardly therefrom.

2. The Background Art

It is common practice in the field of ornamental curbing to place curbstone in lawns and garden areas, particularly in housing areas where, for example, a planting bed of flowers and shrubbery might be separated from a lawn area by a border of curbing. The curbing can act as a divider to prevent lawn from spreading into the planting bed. Ornamental curbing often has a downwardly sloping frontal section which levels off in a kind of ledge surface to accommodate a lawnmower wheel thereupon, which permits the mower to cut the lawn close to the curbing edge, thus avoiding the need for edging.

It has become popular to illuminate lawn and garden areas with lighting, and some attempts have been made to combine the effect of lighting with ornamental curbing. U.S. Pat. No. 5,160,202 (granted Nov. 3, 1992 to Legare), U.S. Pat. No. 3,66,808 (granted May 16, 1972 to Baatz) and U.S. Pat. No. 2,920,184 (granted Jan. 5, 1960 to Kessler) each disclose illuminated curbing systems. However, these prior art systems are characterized by several disadvantages. For example, the lighting structures are unsheathed and can be more easily damaged during installation or removal. The delicate nature of the lighting requires cumbersome and expensive receiving and housing structure for the lighting in order to prevent the lighting from breaking. The lighting structure is not conveniently removable or interchangeable, and fails to provide any option in lighting spacing other than a discontinuous array of unconnected light bulbs and produces discontinuous beams of projecting light.

OBJECTS AND SUMMARY OF THE INVENTION

It is therefore an object of the present invention to provide lighted curbing which is simple in design and manufacture.

It is another object of the present invention, in accordance with one aspect thereof, to provide such lighted curbing wherein the lighting is easier to remove and install and with reduced risk of breaking the lighting.

It is a further object of the present invention, in accordance with one aspect thereof, to provide lighted curbing wherein the lighting is flexible and more durable.

It is an additional object of the present invention, in accordance with one aspect thereof, to provide lighted curbing wherein the lighting is spaced to achieve a substantially continuous array of projecting light.

The above objects and others not specifically recited are realized in a specific illustrative embodiment of an apparatus and method of lighted ground curbing, flatwork and other structures having a recessed channel formed therein for receiving a length of flexible sheathed lighting. The separately sheathed lighting is adequately protected independent of the curbing, flatwork or other structure, and is powered by a power source residing separately and independently of the curbing, to thereby eliminate any need for electrical sockets or protective covering to be included as part of the curbing or flatwork portion. The lighting operates to project a substantially continuous stream of light extending continuously along the recess formed in the curbing, flatwork or other structure.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the illustrated device, and any additional applications of the principles of the invention as illustrated herein, which would normally occur to one skilled in the relevant art and in possession of this disclosure, are to be considered within the scope of the invention claimed.

Applicant has discovered that the functional appeal of curbing and flatwork can be enhanced significantly by projecting a continuous beam of light along the curbing or flatwork. In presently preferred embodiments, the curbing or flatwork includes one or more elongate channels formed therein, and the lighting is separately sheathed and removably disposed in the channel to produce a continuous beam of light 15 (shown in FIGS. 1 and 6) along the curbing or flatwork. The lighting preferably comprises a sequence of small, closely-spaced light bulbs disposed in a flexible translucent or transparent sheath, and the lighting thereby resembles a rope. Other sources of light may be utilized in lieu of bulbs, such as solar-power devices, laser-light devices, or light-emitting fibers such as glass fibers, plastic fibers, or any other suitable device capable of producing light.

Figures 1, 2, 4:
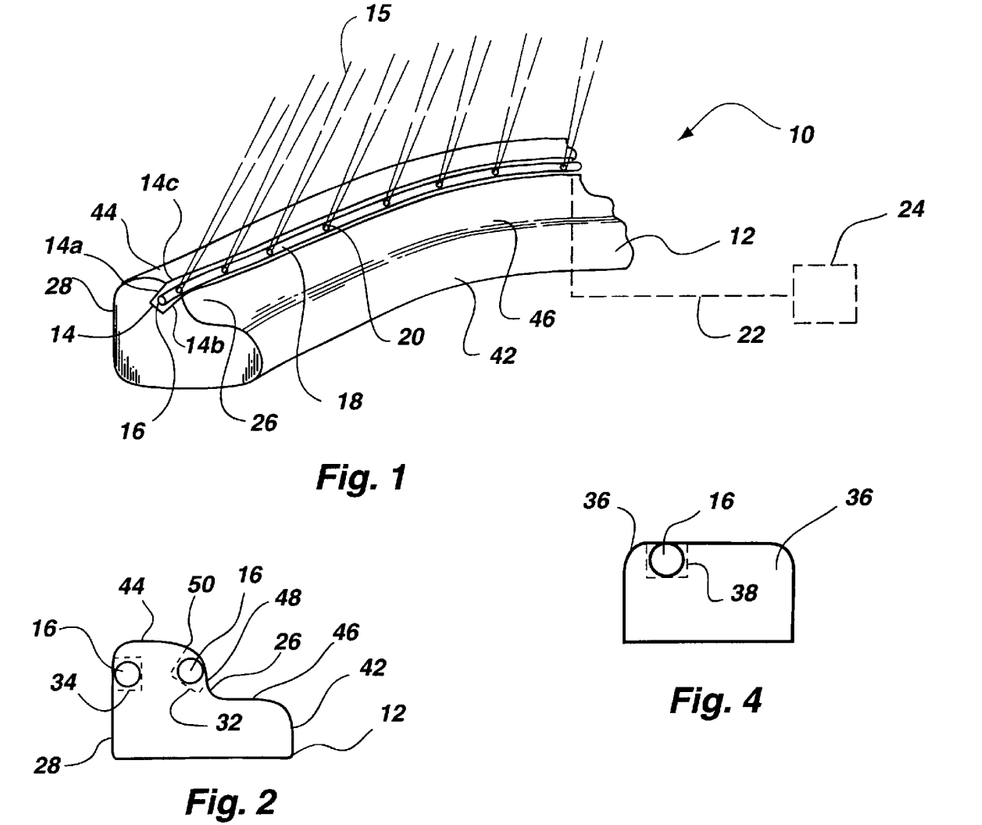
FIG. 1 is a perspective, break-away view of lighted curbing made in accordance with the principles of the present invention.
FIG. 2 is a side elevational view of an alternative embodiment of the lighted curbing of FIG. 1.
FIG. 4 is a side elevational view of still another alternative embodiment of the lighted curbing of FIG. 1.

Referring now to FIG. 1, there is shown one embodiment of the invention, in the form of lighted curbing designated generally at 10. The lighted curbing includes curbing 12 having a channel 14 formed therein, said channel 14 preferably extending along the entire length of the curbing 12. Lighting 16 is disposed in the channel. The lighting 16 is preferably glued to at least one of the sidewalls forming the channel 14 with any suitable type of glue.

The lighting 16 preferably includes an elongate, flexible transparent sheath 18 in which a light source 20 is disposed. The light source 20 is operatively connected by connecting line 22 to a remote power source 24, as shown schematically in FIG. 1. The connecting line 22 may selectively extend underground to be concealed from observers. The light source 20 may comprise any suitable device for producing light, including a plurality of bulbs as shown in FIG. 1, or a solar powered device as known in the art, or a laser light device as known in the art, or light-emitting fibers as known in the art, including flexible glass fibers, flexible plastic fibers, or any other suitable type of light-emitting fiber as known in the art.

In the embodiment shown in FIG. 1, wherein the light source 20 comprises light bulbs, the bulbs are preferably spaced within the sheath 18 at a spacing of at least four bulbs per foot. More preferably, the light bulbs are spaced within the sheath 18 at a spacing of at least six bulbs per foot.

The power source 24 is a schematic representation of whatever power source would necessary to render operative the light source 20 as understood by those of ordinary skill in the relevant fields, whether the light source 20 be conventional light bulbs, a solar powered light device, a laser light device, or light-emitting fibers such as a bundle of fiber-optic fibers. For example, the power source 24 could be a solar power means for receiving sunlight and producing electricity therefrom that is conveyed by the connecting line 22 to the light source 20, and the light source 20 would be an artificial light means disposed within the channel 14 of the curbing 12 receiving the electricity from the solar power means and producing artificial light therefrom.

The curbing 12 includes a front section having a preferably convex face 26, and a rear section preferably comprising a substantially planer face 28. The channel 14 of FIG. 1 is formed in the convex face 26 of the front section, and is an open, recessed channel. The curbing 12 can be utilized as a border, such as to separate a lawn terrain area from a planting bed terrain area.

It will be appreciated that the curbing 12 is one of many types of structures that can be described as a curbing means for residing in a stationary position upon terrain and for forming an elongate boundary between a first terrain area and a second terrain area, said curbing means having a channel formed therein, said channel having an open side along its length.

It will be further appreciated that the lighting 16 is one of many types of structure that can be described as a continuous, elongate, hollow sheath and a light source means for producing light within said sheath, said sheath being configured and dimensioned for inserting into the open side of a channel along the length of the channel and residing within said channel to thereby project light outwardly from, and along at least a portion of, curbing in which the channel is formed.

It is preferred that substantially all portions of the curbing 12 are constructed entirely of a material capable of blocking transmission of light therethrough. The channel 14 preferably extends along at least a majority length of the curbing 12, and the sheath 18 preferably has a length of at least a majority length of the channel 14. More preferably, the channel 14 and sheath 18 both extend along substantially the entire length of the curbing 12.

The channel 14 preferably has a cross-sectional area that is less than one-tenth of a cross-sectional area of the curbing 12, more preferably less than one-fifteenth of a cross-sectional area of the curbing 12, and most preferably less than one-twentieth or even one-thirtieth of a cross-sectional area of the curbing 12.

Figure 6:
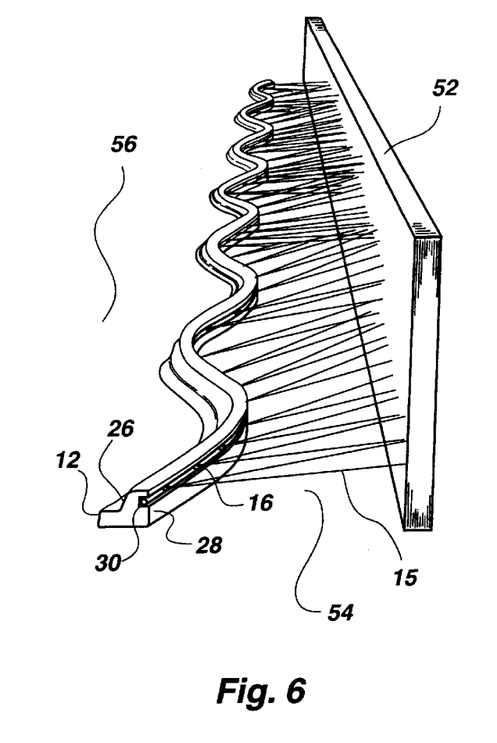
FIG. 6 is a perspective view of a still further alternative embodiment of the lighted curbing of FIG. 1.

Referring now to FIGS. 1–4 and 6 collectively, it will be appreciated that channels for receiving the lighting 16 may be formed in essentially any portion of the curbing. The channel 16 in FIG. 1 is formed in the front, convex face 26, while the channel 30 of FIG. 6 is formed in the rear, substantially planer face 28. Alternatively and as shown in FIG. 2, channels 32 and 34 may be formed in both the front, convex face 26 and in the rear, substantially planer face 28, respectively, if desired. It is to be understood that the front, convex face 26 may also be described as a crown.

Figure 3:
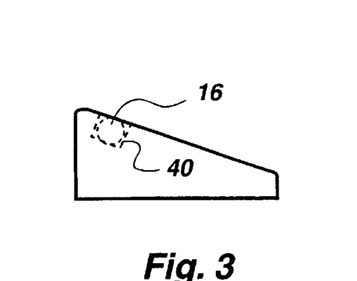
FIG. 3 is a side elevational view of another alternative embodiment of the lighted curbing of FIG. 1.

Referring now to FIGS. 3–4, it will be appreciated that the curbing may assume any cross-sectional shape desired by the builder, such as the square or rectangular cross section with rounded upper corners 36 as depicted in FIG. 4 with a channel 38 formed therein for receiving lighting 16. The cross section may also comprise a somewhat triangular shape as depicted in FIG. 3, with a channel 40 formed therein for receiving lighting 16.

The channel formed in the curbing 12 is preferably continuous and uninterrupted along its length. Most preferably, the sheath 18 resides continuously within the open channel 14 without exiting any portion of the open side 14c of said channel 14 when placed for operation. The open channel 14 is defined by sidewalls 14a and 14b, and the sheath 18 is preferably narrower than said open channel 14 to thereby enable either insertion or removal of said sheath 18 into and from said channel 14, respectively, without exposing the light source 20 to potential contact with the walls 14a and 14b defining said channel 14. The open side 14c of the channel 14 preferably remains uncovered along its length when the sheath 18 resides within said channel 14.

It is further preferable that the sheath 18 be flexible and have an interior width, and the light source 20 reside within said sheath 18 and have a smaller width than the interior width of said sheath 18 to thereby enable said flexible sheath 18 to bend without breaking said light source 20 contained within said sheath 18. The sheath 18 is preferably bendable into a circle having a diameter of less than two feet without breaking the light source 20. More preferably, the sheath 18 is bendable into a circle having a diameter of less than one foot without breaking the light source 20. Most preferably, the sheath 18 is bendable into a circle having a diameter of less than six inches without breaking the light source 20.

Figure 5:
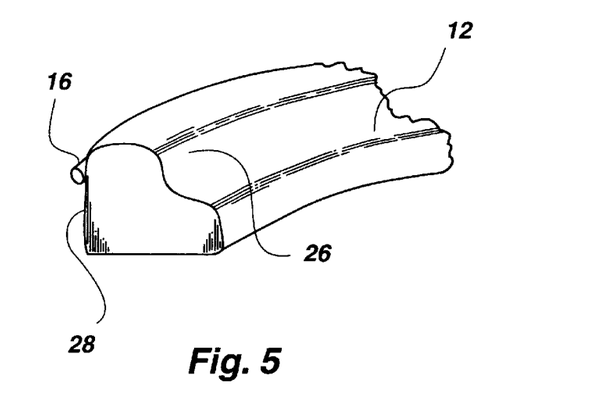
FIG. 5 is a perspective, break-away view of an alternative embodiment of the lighted curbing of FIG. 1.

As shown in FIG. 5, the curbing 12 need not include a channel, and the lighting 16 may simply be disposed on the curbing 12 at any desired location, such as along the rear face 28 as shown. Of course, the lighting 16 may also be disposed along the front, convex face 26 if desired.

The curbing 12 is preferably formed of a cementitious material such as concrete. The curbing 12 preferably comprises a front sidewall 42, the opposing rear sidewall 28, and a top wall 44 extending from the rear sidewall 28 inwardly and at least partially toward the front sidewall 42, and wherein a crown portion includes a first portion 46 extending from the front sidewall 42 inwardly toward the rear sidewall 28 and a second portion 48 (shown most clearly in FIG. 2) extending upwardly from the first portion 46 into a junction 50 (shown most clearly in FIG. 2) with the top wall 44, such that second portion 48 of the crown portion and the top wall 44 collectively form a concave surface. As shown in FIG. 2, the channel 14 is preferably formed in the second portion 48 of the crown portion.

It will be appreciated that material used to form the curbing 12, such as cementitious material like concrete, will have a density of at least 50 pounds per cubic foot, and more likely a density of at least 100 pounds per cubic foot, and most likely a density of at least 130 pounds per cubic foot.

The lighted curbing of the invention may be placed in any setting desired. As shown in FIG. 6, the curbing 12 may be placed near a wall 52 to separate a planting bed terrain area 54 from a lawn area 56, for example. In such a case, the curbing 12 could include the channel 30 formed in the rear face 28 to thereby project the continuous stream of light 15 from the curbing 12 onto the wall 52.

Figure 10:
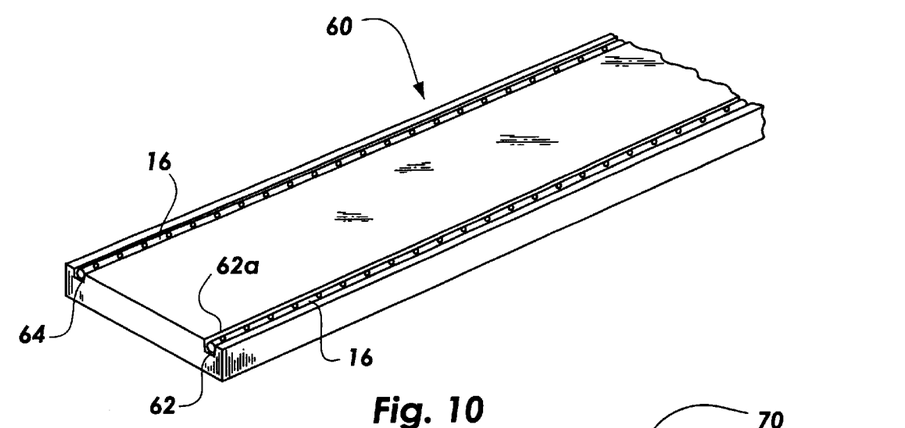
FIG. 10 is a perspective, break-away view of lighted flatwork made in accordance with the principles of the present invention.
Figure 11:
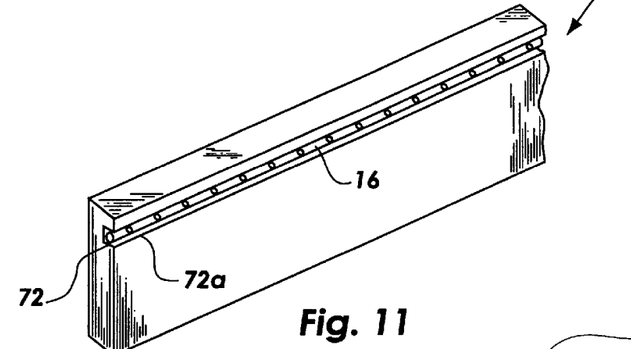
FIG. 11 is a perspective, break-away view of an alternative embodiment of the lighted flatwork of FIG. 10.
Figure 12:
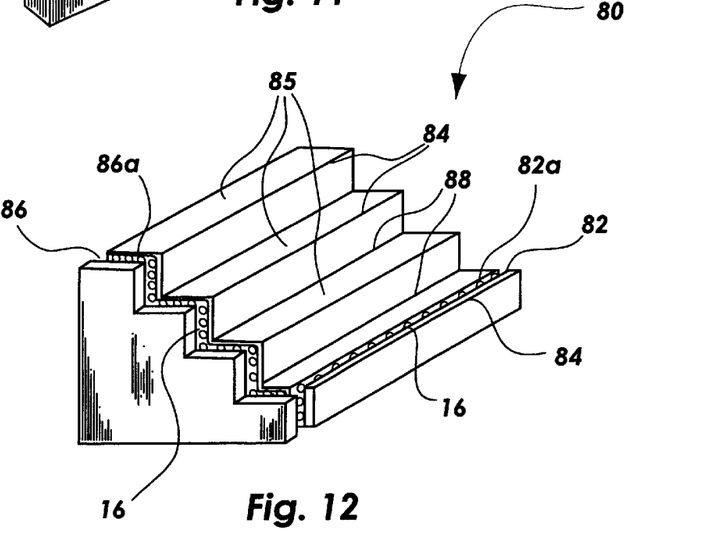
FIG. 12 is a perspective view of another alternative embodiment of the lighted flatwork of FIG. 10.

Referring now to FIGS. 10–12, it will be appreciated that the light source 20 may also be included in various forms of flat work. The phrase "flat work" as used herein shall refer broadly to any structure having surfaces that are mostly flat, regardless of the material from which the structure is made, including, but not limited to, the sidewalk 60 of FIG. 10, the wall 70 of FIG. 11, and the stairs 80 of FIG. 12.

The sidewalk 60, wall 70 and stairs 80 are examples of structures that may be described as a flatwork structure for supporting either static loads or dynamic loads. The sidewalk 60 has a recessed channel 62 formed therein, said channel 62 having an open side 62a along its length. An illumination means such as the lighting 16 is disposed within the channel 62. A second channel 64 may also be formed in the sidewalk 60. The wall 70 has a recessed channel 72 formed therein, said channel 72 having an open side 72a along its length, and wherein an illumination means such as the lighting 16 resides within said recessed channel 72.

The stairs 80 has at least one recessed channel 82 formed therein, said channel having an open side 82a along its length, and wherein an illumination means such as the lighting 16 resides within said recessed channel 82. The channel 82 extends along a corner section 84 of the stairs 80 without extending across any corner of the stairs 80. The stairs 80 may further include a channel 86 is formed within steps 85 of the stairs 80. The channel 86 extends continuously across several sequential steps 85 and around male and female corners 84 and 88, respectively, of said steps 85. Lighting 16 resides within the channel 86 and extends flexibly within said channel 86 and thus also across said several sequential steps 85 and around the male and female corners 84 and 88, respectively, of said steps 85.

It will be appreciated that the structure and apparatus disclosed herein is merely one example of an illumination means for projecting light, and it should be appreciated that any structure, apparatus or system for projecting light which performs functions the same as, or equivalent to, those disclosed herein are intended to fall within the scope of an illumination means, including those structures, apparatus or systems for projecting light which are presently known, or which may become available in the future. Anything which functions the same as, or equivalently to, an illumination means for projecting light falls within the scope of this element.

Figure 7:
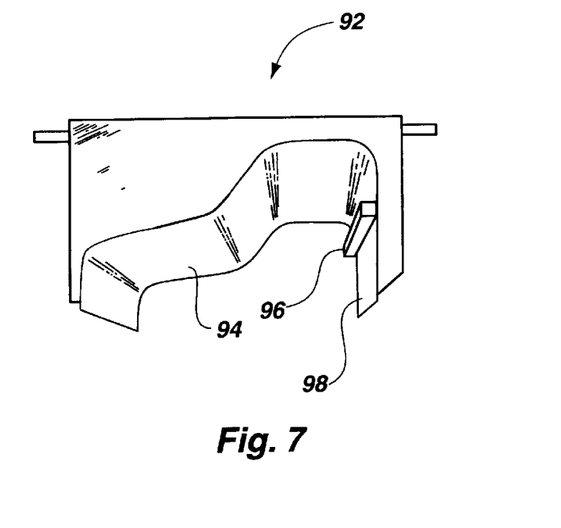
FIG. 7 is a side, perspective view of a curbing mold made in accordance with the principles of the present invention.
Figure 8:
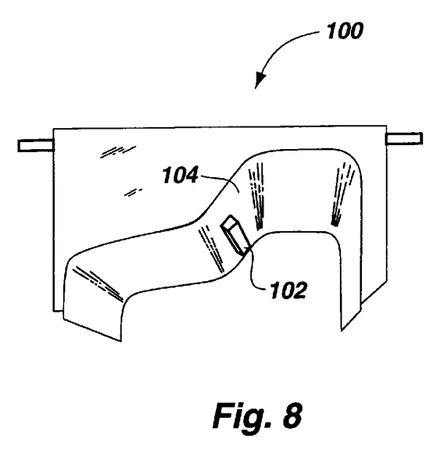
FIG. 8 is a side, perspective view of an alternative embodiment of the curbing mold of FIG. 7.
Figure 9:
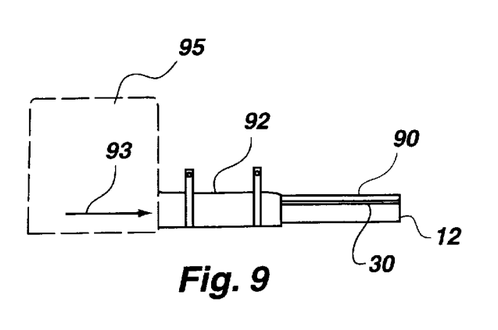
FIG. 9 is a schematic view of one of the molds shown in FIGS. 7–8 in use as part of a curb-forming process in accordance with the principles of the present invention.

Referring now to FIGS. 7–9, and in accordance with the features and combinations described above, a preferred method of assembling a ground curb system includes the steps of:

(a) placing upon a predetermined area of terrain a curbing 12 for residing in a stationary position upon said terrain and forming an elongate boundary between a first terrain area and a second terrain area; and (b) removably placing on the curbing an illumination means for projecting light from said curbing, said illumination means comprising a flexible hollow sheath and light source means for producing light within said flexible hollow sheath.

The method described above may be further augmented, wherein step (a) further comprises forming the curbing 12 by advancing an at least partially uncured cementitious compound 90 through a mold 92 having an interior surface 94 and a projection 96 projecting inwardly from said interior surface 94, in a manner sufficient to cause said compound 90 to mold around said projection 96 to thereby form an open, recessed channel 30 in the curbing 12. Referring briefly to FIG. 9, the compound 90 is fed through the mold 92 as indicated by arrow 93, by any suitable machine or device, represented in schematic phantom line at 95, such as a conventional curbing machine as known to those in the field of concrete curbing.

As such, the mold 92 has the projection 96 disposed on a rear, substantially planer section 98 of said mold 92. In the alternative, a mold 100 (shown in FIG. 8) may be used having a projection 102 disposed on a convex face 104 of a front section of the mold 100.

The mold 92 and the mold 100 are each preferably characterized by an absence of abrupt corners or grooves as shown, except for the projections 96 and 102, respectively. The projections 96 and 102 preferably have a cross-sectional shape of either a square or a rectangle as shown.

Figure 13:
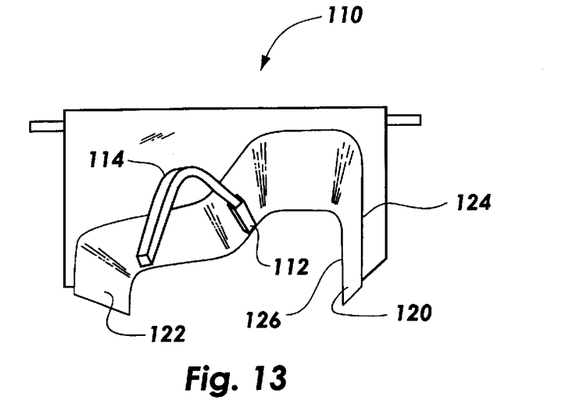
FIG. 13 is a side, perspective view of another alternative embodiment of the curbing mold of FIG. 7.
Figure 14:
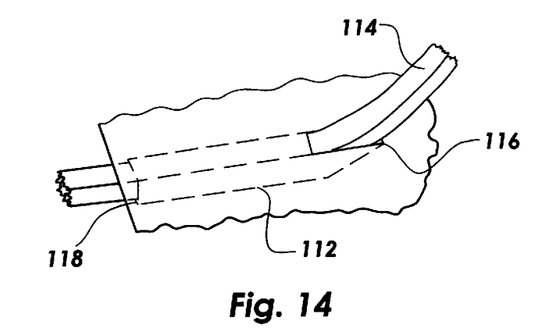
FIG. 14 is a break-away, schematic view of a portion of the curbing mold of FIG. 13.

Referring now to FIGS. 1 and 13–14, there is shown another embodiment of a mold, designated generally at 110, made in accordance with the principles of the present invention. The mold 110 has been found by applicant to be a highly effective tool in forming the curbing 12 (FIG. 1), and in particular in forming the channel 14. It will be appreciated that other versions of the mold 110 may be constructed for forming the channels 30 (FIG. 6), 32 and 34 (FIG. 2), or any other channel.

The curbing 12 is preferably formed from an uncured, flowable material having a non-rigid consistency prior to being cured, such as concrete or some other cementitious compound. As such, the sidewalls 14a and 14b of the channel 14 are at risk of collapsing when the curbing 12 is newly formed but uncured. One solution to this is to removably place a bracing means 114, which is preferably an elongate strip of polymeric foam material, inside the channel 14 until the curbing 12 has cured sufficiently. As such, the bracing means 114 operates as a means removably placeable in the channel 14 of the curbing 12 prior to curing of said curbing for preventing collapse of the sidewalls 14a and 14b defining said channel 14 during curing of said curbing 12. In additional to a polymeric foam material, the bracing means 114 may alternatively comprise any suitable material for satisfying the purpose of preventing collapse of the channel 14, such as wood, cardboard, and non-foam polymeric material.

In accordance with the features and combinations described above, a preferred method of assembling a ground curb system includes the steps of:

(a) forming the curbing 12 by advancing an at least partially uncured compound through the mold 110 having an interior surface and a projection 112 projecting inwardly from said interior surface, in a manner sufficient to cause said compound to mold around said projection 112 to thereby form the open, recessed channel 14 in the curbing means;

(b) removably placing the bracing means 114 in the channel 14 of the curbing 12 prior to curing of said curbing 12 for preventing collapse of sidewalls defining said channel 14 during curing of said curbing 12.

Step (b) above may be augmented by the step of feeding the bracing means 114 through the projection 112 of the mold 110 as the uncured compound is advanced through the mold 110. For example, step (b) may include the step of feeding the bracing means 114 along a movement path through the projection 112 that progresses first (i) through an upper opening 116 in the projection 112, then (ii) through a majority length of the projection 112, then (iii) through an end opening 118 in the projection 112 and into the channel 14.

It will be appreciated that the mold 110 comprises a first side 120 and an opposing second side 122, and a first open end 124 and an opposing second open end 126, said first and second open ends 124 and 126 residing between the first and second sides 120 and 122. The mold 110, having such structural attributes, is the type of mold utilized in a continuous forming type of a process whereby the uncured concrete is simply fed through the mold 110, and the mold 110 advances along as explained above in conjunction with FIG. 9 to form the curbing 12 in a continuous sequence instead of forming all portions of the curbing 12 simultaneously.

Figure 15:
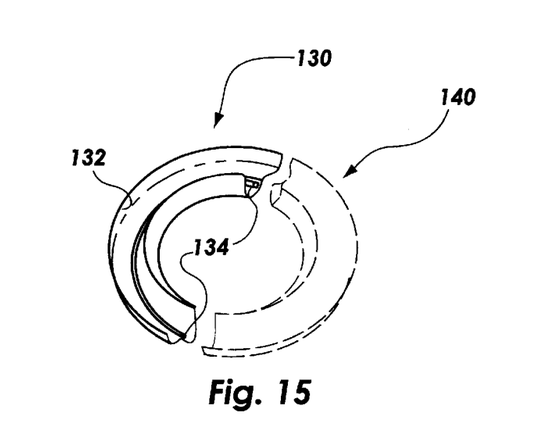
FIG. 15 is a perspective view of another embodiment of a curbing mold made in accordance with the principles of the present invention.

In contrast and in reference now to FIG. 15, curbing may be formed as a "simultaneous" process in that all portions of a section of curbing are molded simultaneously instead in sequentially. The scope of the invention includes a "pre-fab" mold designated generally at 130, wherein the mold 130 comprises a generally arcuate shape configured for forming an arcuate section of curbing. The mold 130 includes a concave, interior surface 132 and a projection 134 extending outwardly from the interior surface 132 for forming an open channel in the curbing for receiving a section of the lighting 16 described above in conjunction with FIG. 1. The mold 130 is shown accompanied by a companion mold 140 depicted schematically in phantom line with the understanding that mold 140 corresponds in shape and structure to the mold 130 but opposite in arcuate direction. The molds 130 and 140 preferably comprise companion semi-circles for shaping concrete curbing having a consistent shape and channel for receiving the lighting 16 (FIG. 1), for example to encircle the base of a tree or shrub.

Figure 16:
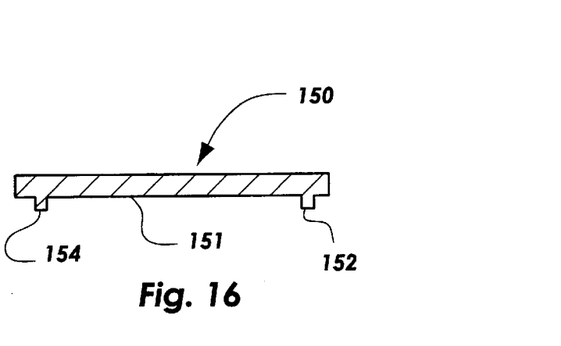
FIG. 16 is a cross-sectional view of an embodiment of a pre-fab form, made in accordance with the principles of the present invention.
Figure 17:
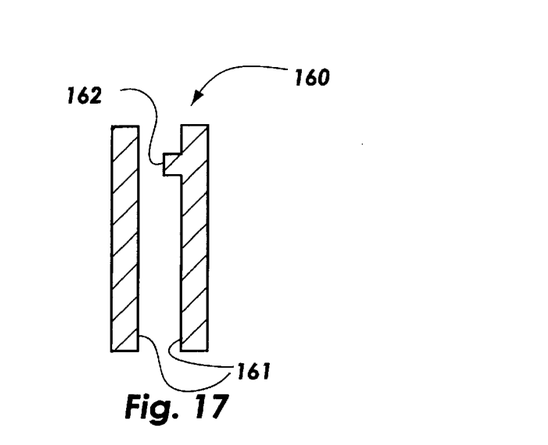
FIG. 17 is a cross-section view of another embodiment of a pre-fab form, made in accordance with the principles of the present invention.

Referring now to FIGS. 16 and 17, there are shown "pre-fab" forms in schematic illustration, for use in constructing the sidewalk 60 and wall 70 of FIGS. 10 and 11, respectively. It is to be understood that any type of curbing, flatwork, or any other structure can be formed to include an open channel for receiving the lighting 16 therein, and the forms shown in FIGS. 16 and 17 are therefore intended to be illustrative and not exhaustive of the instruments and devices with which lighted flatwork might be constructed in accordance with the principles of the present invention.

As such, the forms of FIGS. 16 and 17, and any equivalents or alternatives, may each be described as a mold defining a surface of a flatwork structure, said mold having an interior surface and including an elongate projection disposed on said interior surface defining a shape of the channel of the flatwork structure. For example, in FIG. 16 is a form designated generally at 150, including an interior surface 151 and elongate projections 152 and 154 for forming the channels 62 and 64 shown in FIG. 10. Similarly, in FIG. 17 is a set of forms designated generally at 160, including interior surfaces 161 and an elongate projection 162 for forming the channel 72 shown in FIG. 11.

The invention described herein is new, useful and non-obvious over the prior art known to applicant, for the reasons described herein. The use of a continuous channel formed directly as a part of the curbing, wherein the channel has a relatively small cross-sectional area in comparison to the cross-sectional area of the curbing, in combination with using a flexible light rope 16 that is even narrower than the channel, account for many of the advantages provided by the invention.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A ground curb system comprising:
    curbing means for residing in a stationary position upon terrain and for forming an elongate boundary between a first terrain area and a second terrain area, said curbing means having a channel formed therein, said channel having an open side along its length; and
    a continuous, elongate, flexible hollow sheath and a light source means for producing light within said sheath, said sheath being configured and dimensioned for removably inserting into the open side along the length of the channel and residing within said channel to thereby project light outwardly from, and along at least a portion of, the curbing means.

2. The ground curb system of claim 1, wherein substantially all portions of the curbing means are constructed entirely of a material capable of blocking transmission of light therethrough.

3. The ground curb system of claim 1, wherein the channel extends along a majority length of the curbing means, and wherein the sheath has a length of at least a majority length of the channel.

4. The ground curb system of claim 1, wherein the curbing means comprises an elongate member having a length, and wherein the channel is formed to extend along the entire length of said curbing means.

5. The ground curb system of claim 4, wherein the hollow sheath is disposed within the channel and extends along the entire length of said curbing means.

6. The ground curb system of claim 1, wherein the channel has a cross-sectional area that is less than one-tenth of a cross-sectional area of the curbing means.

7. The ground curb system of claim 6, wherein the cross-sectional area of the channel is less than one-fifteenth of a cross-sectional area of the curbing means.

8. The ground curb system of claim 6, wherein the cross-sectional area of the channel is less than one-twentieth of a cross-sectional area of the curbing means.

9. The ground curb system of claim 1, wherein the channel is formed in a rear section of the curbing means.

10. The ground curb system of claim 9, wherein the rear section of the curbing means defines a substantially vertically-extending face, and wherein the channel is formed in said vertically-extending face.

11. The ground curb system of claim 1, wherein the curbing means includes a front section having a convex face, and wherein the channel comprises a recessed channel formed in the convex face of said front section.

12. The ground curb system of claim 1, wherein the channel comprises a recessed channel formed in a front section of the curbing means, and wherein said curbing means includes a second recessed channel formed in a rear section thereof, said second recessed channel having an open side along its length.

13. The ground curb system of claim 1, wherein the sheath is flexible and bendable.

14. The ground curb system of claim 1, wherein the channel is continuous and uninterrupted along its length and extends along a majority length of the curbing means.

15. The ground curb system of claim 14, wherein the sheath resides continuously within the open channel without exiting any portion of the open side of said channel when placed for operation.

16. The ground curb system of claim 1, wherein the open channel of the curbing means is defined by sidewalls and wherein the sheath is narrower than said open channel to thereby enable either insertion or removal of said sheath into and from said channel, respectively, without exposing said light source means to potential contact with the walls defining said channel.

17. The ground curb system of claim 1, wherein the sheath is flexible and has an interior width, and wherein the light source means resides within said sheath and has a smaller width than the interior width of said sheath to thereby enable said flexible sheath to bend without breaking said light source means contained within said sheath.

18. The ground curb system of claim 17, wherein the sheath is bendable into a circle having a diameter of less than two feet without breaking the light source means.

19. The ground curb system of claim 17, wherein the sheath is bendable into a circle having a diameter of less than one foot without breaking the light source means.

20. The ground curb system of claim 17, wherein the sheath is bendable into a circle having a diameter of less than six inches without breaking the light source means.

21. The ground curb system of claim 1, wherein the light source means comprises a bundle of light-emitting fibers.

22. The ground curb system of 21, wherein the bundle of fibers comprises flexible glass fibers.

23. The ground curb system of claim 21, wherein the bundle of fibers comprises flexible plastic fibers.

24. The ground curb system of claim 1, wherein the light source means comprises:

solar power means for receiving sunlight and producing electricity therefrom; and artificial light means disposed within the channel of the curbing means for receiving the electricity from the solar power means and producing artificial light therefrom.

25. The ground curb system of claim 1, wherein the light source means comprises:

laser power means for producing laser light within the channel of the curbing means.

26. The ground curb system of claim 1, wherein the curbing means is formed of concrete.

27. The ground curb system of claim 1, wherein a portion of the curbing means is formed as a crown portion extending lengthwise along said curbing means, and wherein the channel is formed in said crown portion.

28. The ground curb system of claim 27, wherein the curbing means comprises a front sidewall, an opposing rear sidewall, and a top wall extending from the rear sidewall inwardly and at least partially toward the front sidewall, and wherein the crown portion includes a first portion extending from the front sidewall inwardly toward the rear sidewall and a second portion extending upwardly from the first portion into a junction with the top wall, such that the second portion of the crown portion and the top wall collectively form a concave surface.

29. The ground curb system of claim 28, wherein the open channel is formed in the second portion of the crown portion.

30. The ground curb system of claim 29, wherein the curbing means has a length and wherein the open channel extends, without interruption, along the entire length of the curbing means.

31. The ground curb system of claim 1, wherein the curbing means comprises a barrier means for blocking plant growth from spreading between the first terrain area and the second terrain area.

32. The ground curb system of claim 1, wherein the curbing means has a density of at least 50 pounds per cubic foot.

33. The ground curb system of claim 1, wherein the curbing means has a density of at least 100 pounds per cubic foot.

34. The ground curb system of claim 1, wherein the curbing means has a density of at least 130 pounds per cubic foot.

35. The ground curb system of claim 1, wherein the light source means comprises a plurality of sequentially spaced light bulbs disposed in the sheath.

36. The ground curb system of claim 35, wherein the light bulbs are spaced within the sheath at a spacing of at least four bulbs per foot.

37. The ground curb system of claim 35, wherein the light bulbs are spaced within the sheath at a spacing of at least six bulbs per foot.

38. The ground curb system of claim 1, wherein the curbing means has a length and wherein the open channel extends, without interruption, along the entire length of the curbing means.

39. The ground curb system of claim 1, wherein the channel is a recessed channel formed in a front section of the curbing means, said front section having a convex curvilinear cross-sectional shape.

40. The ground curb system of claim 1, wherein the open side of the channel remains uncovered along its length when the sheath resides within said channel.

41. The ground curb system of claim 1, wherein the channel of the curbing means is defined by sidewalls and wherein said curbing means is formed from an uncured, flowable material having a non-rigid consistency prior to being cured, said ground curb system further comprising:

bracing means removably placeable in the channel of the curbing means prior to curing of said curbing means for preventing collapse of the sidewalls defining said channel during curing of said curbing means.

42. The ground curb system of claim 41, wherein the bracing means comprises at least one elongate member.

43. The ground curb system of claim 42, wherein the bracing means comprises a polymeric foam material.

44. The ground curb system of claim 1, further comprising a mold defining a shape of the curbing means, said mold having an interior surface defining a concave shape and an elongate projection disposed on said interior surface defining a shape of the channel of the curbing means.

45. The ground curb system of claim 44, wherein the elongate projection has a cross-sectional shape selected from the group consisting of a square and a rectangle.

46. The ground curb system of claim 44, wherein the mold comprises a first side and an opposing second side, and a first open end and an opposing second open end, said first and second open ends residing between the first and second sides.

47. The ground curb system of claim 44, wherein the mold comprises a generally arcuate shape configured for forming the curbing means in an arcuate shape.

48. The ground curb system of claim 47, wherein the mold comprises a generally semi-circular shape configured for forming the curbing means in a semi-circular shape.

49. The ground curb system of claim 44, wherein the elongate projection is hollow and includes an upper opening and an end opening defining a movement feed path extending from the upper opening through the hollow projection and out of the end opening.

50. The ground curb system of claim 49, wherein the projection is configured and dimensioned to permit feeding along the movement feed path of a bracing means removably placeable in the channel of the curbing means prior to curing of said curbing means for preventing collapse of sidewalls defining said channel during curing of said curbing means.

51. A ground curb system comprising:

curbing means for residing in a stationary position upon terrain and for forming an elongate boundary between a first terrain area and a second terrain area; and illumination means for projecting light from the curbing means, said illumination means comprising a flexible hollow sheath removably disposable on the curbing means and a light source means for producing light within said flexible hollow sheath.

52. The ground curb system as defined in claim 51, wherein said flexible sheath has an interior width and wherein the light source means is disposed within said flexible sheath and has a smaller width than the interior width of the flexible sheath to thereby enable said flexible sheath to bend without breaking said light source means contained within said sheath.

53. The ground curb system of claim 51, wherein the illumination means is bendable into a circle having a diameter of less than one foot without breaking the light source means.

54. The ground curb system of claim 51, wherein the curbing means has a density of at least 100 pounds per cubic foot.

55. A lighted flatwork structure comprising:

a flatwork structure for supporting either static loads or dynamic loads; and illumination means for projecting light from the flatwork structure, said illumination means comprising a flexible hollow sheath removably disposable on the flatwork structure and a light source means for producing light within said flexible hollow sheath.

56. The lighted flatwork of claim 55, wherein the flatwork structure comprises a sidewalk having a recessed channel formed therein, said channel having an open side along its length, and wherein the illumination means resides within said recessed channel.

57. The lighted flatwork of claim 55, wherein the flatwork structure comprises a wall having at least one recessed channel formed therein, said channel having an open side along its length, and wherein the illumination means resides within said recessed channel.

58. The lighted flatwork of claim 55, wherein the flatwork structure comprises stairs having at least one recessed channel formed therein, said channel having an open side along its length, and wherein the illumination means resides within said recessed channel.

59. The light flatwork of claim 58, wherein the channel extends along a corner section of the stairs without extending across any corner of the stairs.

60. The ground curb system of claim 58, wherein the channel is formed within steps of the stairs and extends continuously across several sequential steps and around male and female corners of said steps, and wherein the illumination means residing within said channel extends flexibly within said channel and thus also across said several sequential steps and around male and female corners of said steps.

61. The ground curb system of claim 55, wherein the flatwork structure has a recessed channel formed therein, said channel having an open side along its length, and wherein the illumination means resides within said recessed channel.

62. The ground curb system of claim 55, further comprising a mold defining a surface of the flatwork structure, said mold having an interior surface and including an elongate projection disposed on said interior surface defining a shape of the channel of the flatwork structure.

63. The ground curb system of claim 62, wherein the elongate projection has a cross-sectional shape selected from the group consisting of a square and a rectangle.

64. A ground curb system comprising:

curbing means for residing in a stationary position upon terrain and for forming an elongate boundary between a first terrain area and a second terrain area, said curbing means having a recessed channel formed therein, said channel having an open side along its length;

a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein substantially all portions of the curbing means are constructed entirely of a material capable of blocking transmission of light therethrough;

wherein the channel extends along a majority length of the curbing means, and wherein the sheath has a length of at least a majority length of the channel;

wherein the curbing means comprises an elongate member having a length, and wherein the recessed channel is formed to extend along the entire length of said curbing means;

wherein the hollow sheath is disposed within the recessed channel and extends along the entire length of said curbing means;

wherein the cross-sectional area of the recessed channel is less than one-fifteenth of a cross-sectional area of the curbing means;

wherein the sheath is flexible and bendable;

wherein the channel is continuous and uninterrupted along its length and extends along a majority length of the curbing means;

wherein the sheath resides continuously within the open channel without exiting any portion of the open side of said channel when placed for operation;

wherein the open channel of the curbing means is defined by sidewalls and wherein the sheath is narrower than said open channel to thereby enable either insertion or removal of said sheath into and from said channel, respectively, without exposing said light source means to potential contact with the walls defining said channel;

wherein the sheath is flexible and has an interior width, and wherein the light source means resides within said sheath and has a smaller width than the interior width of said sheath to thereby enable said flexible sheath to bend without breaking said light source means contained within said sheath;

wherein the sheath is bendable into a circle having a diameter of less than one foot without breaking the light source means;

wherein the curbing means is formed of concrete;

wherein the curbing means comprises a front sidewall, an opposing rear sidewall, and a top wall extending from the rear sidewall inwardly and at least partially toward the front sidewall, and wherein the crown portion includes a first portion extending from the front sidewall inwardly toward the rear sidewall and a second portion extending upwardly from the first portion into a junction with the top wall, such that the first and second portions of the crown portion collectively form a concave surface;

wherein the curbing means comprises a barrier means for blocking plant growth from spreading between the first terrain area and the second terrain area;

wherein the curbing means has a density of at least 100 pounds per cubic foot;

wherein the light source means comprises a plurality of sequentially spaced light bulbs disposed in the sheath;

wherein the light bulbs are spaced within the sheath at a spacing of at least four bulbs per foot;

wherein the open side of the recessed channel remains uncovered along its length when the sheath resides within said channel;

wherein the recessed channel is formed in a rear section of the curbing means;

wherein the rear section of the curbing means defines a substantially vertically-extending face, and wherein the recessed channel is formed in said vertically-extending face.

65. The ground curb system of claim 64, wherein the curbing means includes a front section having a convex face, and wherein said curbing means includes a second recessed channel formed in the convex face of said front section, said second recessed channel having an open side along its length.

66. The ground curb system of claim 64, further comprising a mold defining a shape of the curbing means, said mold having an interior surface defining a concave shape and an elongate projection disposed on said interior surface defining a shape of the channel of the curbing means.

67. The ground curb system of claim 66, wherein the elongate projection has a cross-sectional shape selected from the group consisting of a square and a rectangle.

68. A method of assembling a ground curb system, said method comprising the steps of:
(a) placing upon a predetermined area of terrain a curbing means for residing in a stationary position upon said terrain and forming an elongate boundary between a first terrain area and a second terrain area; and
(b) removably placing on the curbing means an illumination means for projecting light from said curbing means, said illumination means comprising a flexible hollow sheath and light source means for producing light within said flexible hollow sheath.

69. The method of claim 68, wherein step (a) further comprises forming the curbing means by advancing an at least partially uncured compound through a mold having an interior surface and a projection projecting inwardly from said interior surface, in a manner sufficient to cause said compound to mold around said projection to thereby form an open, recessed channel in the curbing means.

70. The method of claim 69, wherein step (a) further comprises advancing the compound through a mold having the projection disposed on a rear, substantially planer section of said mold.

71. The method of claim 69, wherein step (a) further comprises advancing the compound through a mold having the projection disposed on a convex face of a front section of the mold.

72. The method of claim 69, wherein step (b) further comprises placing the sheath within the open, recessed channel.

73. The method of claim 69, wherein step (a) further comprises advancing the compound through a mold that is characterized by an absence of abrupt corners or grooves except for the projection.

74. The method of claim 69, wherein step (a) further comprises advancing the compound through the mold wherein the projection has a cross-section shape selected from the group consisting of a square or a rectangle.

75. The method of claim 69, wherein step (a) further comprises advancing a cementitious compound through the mold.

76. The method of claim 69, wherein step (a) further comprises removably placing a bracing means in the channel of the curbing means prior to curing of said curbing means for preventing collapse of sidewalls defining said channel during curing of said curbing means.

77. The method of claim 76, wherein step (a) further comprises feeding the bracing means through the projection of the mold as the uncured compound is advanced through the mold.

78. The method of claim 77, wherein step (a) further comprises feeding the bracing means along a movement path through the projection that progresses first (i) through an upper opening in the projection, then (ii) through a majority length of the projection, then (iii) through an end opening in the projection and into the channel.

79. The method of claim 76, wherein step (a) further comprises removably placing a bracing means made of a polymeric foam material in the channel of the curbing means.

80. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the channel extends along a majority length of the curbing means, and wherein the sheath has a length of at least a majority length of the channel.

81. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the curbing means comprises an elongate member having a length, and wherein the channel is formed to extend along the entire length of said curbing means.

82. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the channel has a cross-sectional area that is less than one-tenth of a cross-sectional area of the curbing means.

83. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the channel is formed in a rear section of the curbing means.

84. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the curbing means includes a front section having a convex face, and wherein the channel comprises a recessed channel formed in the convex face of said front section.

85. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the channel comprises a recessed channel formed in a front section of the curbing means, and wherein said curbing means includes a second recessed channel formed in a rear section thereof, said second recessed channel having an open side along its length.

86. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of the curbing means;

wherein the sheath is flexible and bendable.

87. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the channel is continuous and uninterrupted along its length and extends along a majority length of the curbing means.

88. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the open channel of the curbing means is defined by sidewalls and wherein the sheath is narrower than said open channel to thereby enable either insertion or removal of said sheath into and from said channel, respectively, without exposing said light source means to potential contact with the walls defining said channel.

89. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate hollow sheath and a light source means for producing light, within said sheath, said sheath being configured and dimensioned for inserting into the open side along the length of the channel and residing within said channel to thereby project light outwardly from, and along at least a portion of, the curbing means;

wherein the sheath is flexible and has an interior width, and wherein the light source means resides within said sheath and has a smaller width than the interior width of said sheath to thereby enable said flexible sheath to bend without breaking said light source means contained within said sheath.

90. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the light source means comprises a bundle of light-emitting fibers.

91. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the light source means comprises:

solar power means for receiving sunlight and producing electricity therefrom; and artificial light means disposed within the channel of the curbing means for receiving the electricity from the solar power means and producing artificial light therefrom.

92. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein a portion of the curbing means is formed as a crown portion extending lengthwise along said curbing means, and wherein the channel is formed in said crown portion.

93. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the curbing means comprises a barrier means for blocking plant growth from spreading between the first terrain area and the second terrain area.

94. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the curbing means has a density of at least 50 pounds per cubic foot.

95. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a right source means for producing light within said sheath, said sheath being configured and dimensioned for inserting into the open side along the length of the channel and residing within said channel to thereby project light outwardly from, and along at least a portion of, the curbing means;

wherein the curbing means has a density of at least 100 pounds per cubic foot.

96. A ground curb system comprising:

curbing means for residing in a stationary position upon terrain and for forming an elongate boundary between a first terrain area and a second terrain area, said curbing means having a channel formed therein, said channel having an open side alone its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the curbing means has a density of at least 130 pounds per cubic foot.

97. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the light source means comprises a plurality of sequentially spaced light bulbs disposed in the sheath.

98. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the curbing means has a length and wherein the open channel extends, without interruption, along the entire length of the curbing means.

99. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the channel is a recessed channel formed in a front section of the curbing means, said front section having a convex curvilinear cross-sectional shape.

100. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the open side of the channel remains uncovered along its length when the sheath resides within said channel.

101. A ground curb system comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

wherein the channel of the curbing means is defined by sidewalls and wherein said curbing means is formed from an uncured, flowable material having a non-rigid consistency prior to being cured, said ground curb system further comprising:

bracing means removably placeable in the channel of the curbing means prior to curing of said curbing means for preventing collapse of the sidewalls defining said channel during curing of said curbing means;

wherein the bracing means comprises at least one elongate member;

wherein the bracing means comprises a polymeric foam material.

102. A ground curb system, comprising:

curbing means for residing in a stationary position upon terrain and for forming an elongate boundary between a first terrain area and a second terrain area, said curbing means having a channel formed therein, said channel having an open side along its length; and a continuous, elongate, hollow sheath and a light source means for producing light within said sheath, said sheath being configured and dimensioned for inserting into the open side along the length of the channel and residing within said channel to thereby project light outwardly from, and along at least a portion of, the curbing means;

further comprising a mold defining a shape of the curbing means, said mold having an interior surface defining a concave shape and an elongate projection disposed on said interior surface defining a shape of the channel of the curbing means.

* * * * *